US011202237B2

(12) United States Patent
Chen et al.

(10) Patent No.: US 11,202,237 B2
(45) Date of Patent: Dec. 14, 2021

(54) METHOD FOR PREVENTING AN INTER-RAT CHANGE FROM BEING TRIGGERED AND COMMUNICATIONS APPARATUS UTILIZING THE SAME

(71) Applicant: MEDIATEK INC., Hsinchu (TW)

(72) Inventors: Lung-Wen Chen, Hsinchu (TW); Tsung-Ming Lee, Hsinchu (TW); Chun-Pin Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/505,300

(22) Filed: Jul. 8, 2019

(65) Prior Publication Data

US 2020/0037213 A1 Jan. 30, 2020

Related U.S. Application Data

(60) Provisional application No. 62/702,441, filed on Jul. 24, 2018.

(51) Int. Cl.
| | |
|---|---|
| *H04L 12/28* | (2006.01) |
| *H04W 36/00* | (2009.01) |
| *H04W 36/32* | (2009.01) |
| *H04W 36/30* | (2009.01) |
| *H04W 76/10* | (2018.01) |
| *H04W 76/30* | (2018.01) |

(52) U.S. Cl.
CPC ... *H04W 36/0058* (2018.08); *H04W 36/0079* (2018.08); *H04W 36/0085* (2018.08); *H04W 36/305* (2018.08); *H04W 36/32* (2013.01); *H04W 76/10* (2018.02); *H04W 76/30* (2018.02)

(58) Field of Classification Search
CPC ..................................................... H04L 12/50
USPC ........................................................ 370/400
See application file for complete search history.

(56) References Cited

U.S. PATENT DOCUMENTS

2013/0210422 A1* 8/2013 Pani .................. H04W 48/16
455/423
2015/0126206 A1  5/2015 Krishnamurthy et al.
(Continued)

FOREIGN PATENT DOCUMENTS

CN  101841835 A  8/2010
CN  105580427 A  5/2016
(Continued)

OTHER PUBLICATIONS

Chinese language office action dated Feb. 27, 2020, issued in application No. TW 108125573.
(Continued)

*Primary Examiner* — Dang T Ton
(74) *Attorney, Agent, or Firm* — McClure, Qualey & Rodack, LLP (57) ABSTRACT

A method for enhancing mobility of a communications apparatus is provided. The method includes the steps of: establishing a connection with a cell; measuring one or more parameters of one or more cells; transmitting a measurement report to a network device according to the measured parameters of the one or more cells; determining whether a mobility command is received from the network device after transmitting the measurement report; and triggering a connection release procedure based on no mobility command being received from the network device after transmitting the measurement report.

20 Claims, 6 Drawing Sheets

(56) References Cited

U.S. PATENT DOCUMENTS

| | | |
|---|---|---|
| 2015/0312616 A1 | 10/2015 | Smith et al. |
| 2015/0312818 A1 | 10/2015 | Yiu et al. |
| 2016/0135103 A1 | 5/2016 | Lee et al. |
| 2016/0262100 A1* | 9/2016 | Larsson ................ H04W 48/16 |
| 2018/0035330 A1 | 2/2018 | Wu |
| 2020/0275319 A1* | 8/2020 | Murray ............. H04W 36/0005 |

FOREIGN PATENT DOCUMENTS

| | | |
|---|---|---|
| CN | 107438266 A | 12/2017 |
| EP | 3244655 A1 | 11/2017 |
| WO | WO-2013027993 A2 * | 2/2013 ........ H04W 36/0094 |

OTHER PUBLICATIONS

Chinese Language Office Action dated Apr. 20, 2021 of a corresponding China patent application No. 201910670695.7.

* cited by examiner

METHOD FOR PREVENTING AN INTER-RAT CHANGE FROM BEING TRIGGERED AND COMMUNICATIONS APPARATUS UTILIZING THE SAME

CROSS REFERENCE TO RELATED APPLICATIONS

This application claims the benefit of U.S. Provisional Application No. 62/702,441 filed Jul. 24, 2019 the entirety of which is incorporated by reference herein.

BACKGROUND OF THE INVENTION

Field of the Invention

The invention relates to methods for enhancing mobility of a communications apparatus, and more particularly to methods for enhancing mobility of a communications apparatus when the cellular network ignores the measurement report transmitted by the communications apparatus.

Description of the Related Art

The term "wireless" normally refers to an electrical or electronic operation that is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party from many locations worldwide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly used communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. Wireless Fidelity (Wi-Fi) is a technology defined by the 802.11 engineering standard that can be used for home networks, mobile phones, and video games to provide a high-frequency wireless local area network. Long-Term Evolution (LTE) is a standard for wireless communication of high-speed data for mobile phones and data terminals. It is based on the GSM/EDGE and UMTS/HSPA network technologies, increasing the capacity and speed using a different radio interface together with core network improvements. 5G New Radio (NR) is a new radio access technology (RAT) developed by 3GPP for the 5G (fifth generation) mobile network. It's meant to be the global standard for the air interface of 5G networks.

In order to enhance mobility of a communications apparatus and further improve user experience when the communications apparatus has transmitted measurement report to the cellular network one or more times but the cellular network ignores measurement report transmitted by the communications apparatus, several methods are provided.

BRIEF SUMMARY OF THE INVENTION

Communications apparatus and method for enhancing mobility of a communications apparatus are provided. An exemplary embodiment of a communications apparatus comprises a transceiver and a processor. The transceiver is capable of transmitting or receiving wireless signals to communicate with a network device. The processor is coupled to the transceiver such that the processor performs operations comprising: establishing a connection with a cell; measuring one or more parameters of one or more cells; transmitting a measurement report to the network device according to the measured parameters of the one or more cells; determining whether a mobility command is received from the network device after transmitting the measurement report; and triggering a connection release procedure based on no mobility command being received from the network device after transmitting the measurement report.

Another exemplary embodiment of a method comprises the steps of: establishing a connection with a cell; measuring one or more parameters of one or more cells; transmitting a measurement report to a network device according to the measured parameters of the one or more cells; determining whether a mobility command is received from the network device after transmitting the measurement report; and triggering a connection release procedure based on no mobility command being received from the network device after transmitting the measurement report.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
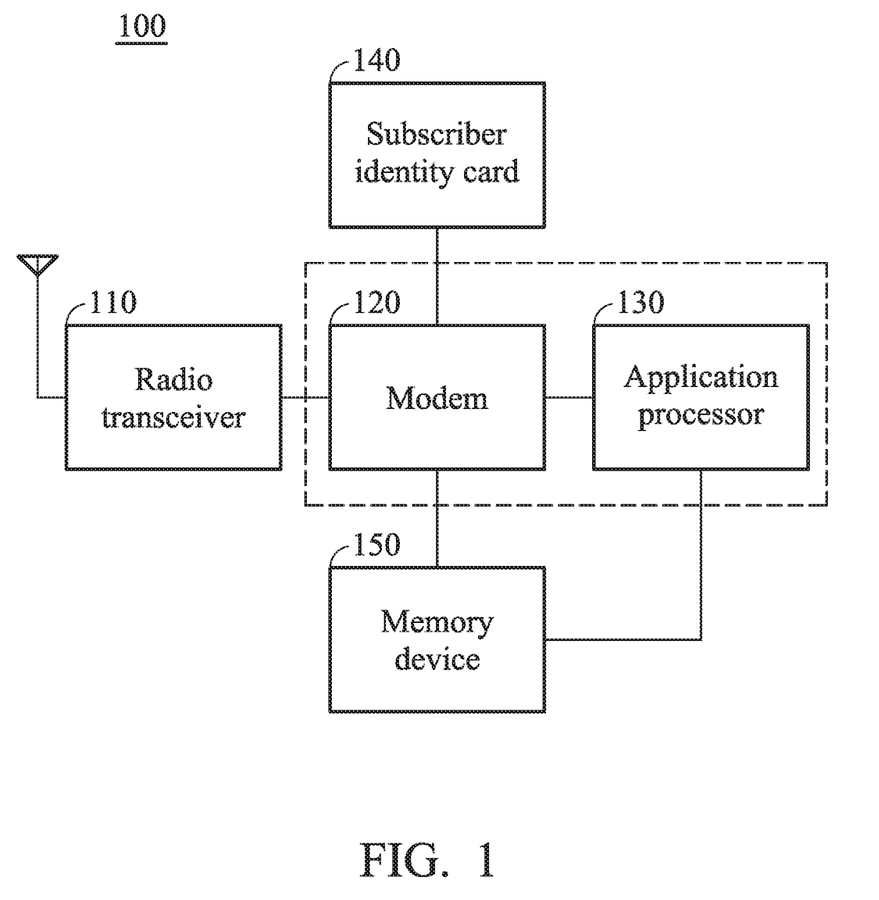
FIG. 1 shows an exemplary block diagram of a communications apparatus according to an embodiment of the invention.

FIG. 1 shows an exemplary block diagram of a communications apparatus according to an embodiment of the invention. The communications apparatus 100 may be a portable electronic device, such as a Mobile Station (MS, which may be interchangeably referred to as User Equipment (UE)). The communications apparatus 100 may comprise at least an antenna module comprising at least one antenna, a radio transceiver 110, a modem 120, an application processor 130, a subscriber identity card 140, and a memory device 150. The radio transceiver 110 may receive wireless radio frequency signals from an air interface via the antenna module, transmit wireless radio frequency signals to the air interface via the antenna module and perform RF signal processing. For example, the radio transceiver 110 may convert the received signals into intermediate frequency (IF) or baseband signals to be processed, or receive the IF or baseband signals from the modem 120 and convert the received signals into wireless radio frequency signals to be transmitted to a network device in a cellular network. According to an embodiment of the invention, the network device may be a cell, a node B, an evolved node B (eNB), a g node B (gNB), a base station, a Mobility Management Entity (MME) etc., at the network side of the cellular network and communicating with the communications apparatus 100 via the wireless radio frequency signals.

The radio transceiver 110 may comprise a plurality of hardware devices to perform radio frequency conversion and RF signal processing. For example, the radio transceiver 110 may comprise a power amplifier for amplifying the RF signals, a filter for filtering unwanted portions of the RF signals and/or a mixer for performing radio frequency conversion. According to an embodiment of the invention, the radio frequency may be, for example, 900 MHz or 1800 MHz for a Global System for Mobile communication (GSM), or 1900 MHz for a Universal Mobile Telecommunications System (UMTS), or the frequency of any specific frequency band for a CDMA 2000 system, or the frequency of any specific frequency band for a Long-Term Evolution (LTE) system, or the frequency of any specific frequency band for a 5G new radio (NR) system, etc.

The modem 120 may be a cellular communications modem configured to handle corresponding communications protocol operations and processing the IF or baseband signals received from or to be transmitted to the radio transceiver 110. The application processor 130 is configured to run the operating system of the communications apparatus 100 and run application programs installed in the communications apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communications apparatus may further comprise some peripheral devices not shown in FIG. 1. In another example, in some embodiments of the invention, the communications apparatus may further comprise a central controller coupled to the modem 120 and the application processor 130. Therefore, the invention should not be limited to what is shown in FIG. 1.

In some embodiments of the invention, the communications apparatus is capable of supporting multiple radio access technologies (RATs) communications via the single-card structure as shown in FIG. 1. It should be noted that, although FIG. 1 shows a single-card application, the invention should not be limited thereto. For example, in some embodiments of the invention, the communications apparatus may comprise multiple subscriber identity cards to support the multi-RATs communications, in either a single-standby or a multiple-standby manner. In the multi-RATs communications applications, the modem, the radio transceiver and/or the antenna module may be shared by the subscriber identity card(s) and may have the capability of handling the operations of different RATs and processing the corresponding RF, IF or baseband signals in compliance with the corresponding communications protocols.

In addition, those who are skilled in this technology can still make various alterations and modifications based on the descriptions given above to derive the communications apparatuses comprising multiple radio transceivers and/or multiple antenna modules for supporting multi-RAT wireless communications without departing from the scope and spirit of this invention. Therefore, in some embodiments of the invention, the communications apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be individual identifiers, numbers, addresses, or the like which are burned in the internal memory device of the corresponding modem and are capable of identifying the communications apparatus. Therefore, the invention should not be limited to what is shown in the figures.

It should be further noted that in some embodiments of the invention, the communications apparatus may further support multiple IMSIs.

Figure 2:
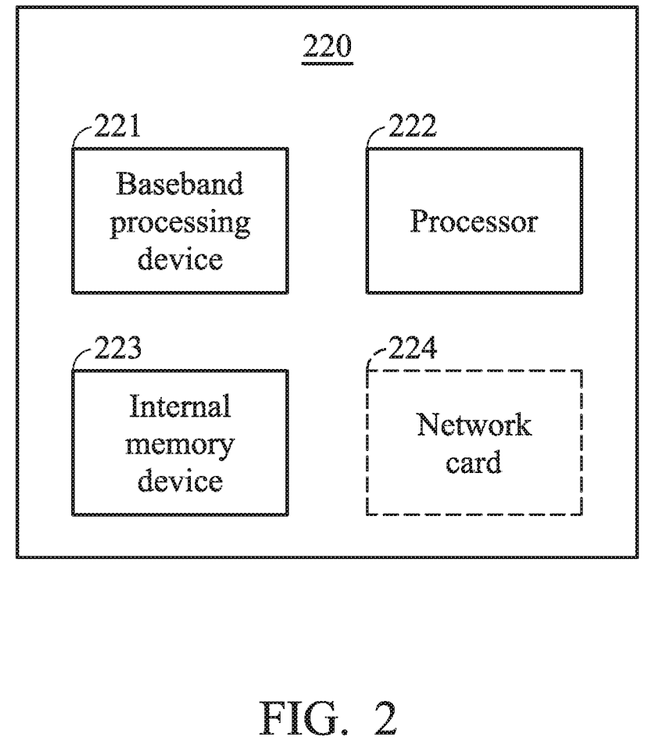
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In a preferred embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140, and write data to the subscriber identity card. The internal memory device 223 may store system data and user data for the modem 220. The processor 222 may also access the internal memory device 223.

The network card 224 provides Internet access services for the communications apparatus. It should be noted that, although the network card 224 shown in FIG. 2 is configured inside of the modem, the invention should not be limited thereto. In some embodiments of the invention, the communications apparatus may also comprise a network card configured outside of the modem, or the communications apparatus may also be coupled to an external network card for providing Internet access services. In some embodiments of the invention, the network card 224 may be a virtual network card, instead of a tangible card, that is created by the operating system of the communications apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem may also comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the processor 222 may be integrated into one processing unit, and the modem may comprise one or more multiple such processing units, for supporting multi-RAT operations. Therefore, the invention should not be limited to what is shown in FIG. 2.

According to an embodiment of the invention, the communications apparatus 100 may communicate with one or more cells in the cellular network.

For example, in an intra-LTE scenario, the communications apparatus 100 may camp on a serving cell and communicate with the serving cell in the LTE network. In addition to the serving cell, the communications apparatus 100 may also communicate with some neighbor cells in the LTE network for collecting system information therefrom.

For another example, in a Dual Connectivity (DC) scenario where a Master Cell Group (MCG) and a Secondary Cell Group (SCG) are configured for achieving dual connectivity in LTE or for achieving LTE-5G NR dual connectivity in a non-standalone NR system, the communications apparatus 100 may communicate with a plurality of cells in the cellular network, wherein the cells may comprise multiple LTE cells or at least one LTE cell and at least one NR cell.

The network device in the cellular network may configure some measurement for the communications apparatus 100 to report. For example, the processor 222 is configured to receive a measurement configuration comprising different measurement reporting criteria for different types of cells from the network device. In response to the measurement configuration, the processor 222 is configured to measure one or more parameters (e.g. the RSRP, RSRQ, or others) of one or more cells according to the measurement configuration configured by the network device. Based on the measured parameters, when one or more reporting criteria are met, the processor 222 may transmit a corresponding measurement report to the network device to report the current measured results (for example, the measured signal qualities of the cells)

The network device may dynamically adjust the measurement configuration based on the measured parameters or measured signal qualities of the cells reported by the communications apparatus 100. Generally, the communications apparatus 100 may be configured with multiple measurement reports, depending on the measurement configurations. Different measurement report can be identified via measurement event ID (or, measurement ID). For example, the measurement event A2 is that "Serving becomes worse than threshold", the measurement event A3 is that "Neighbour becomes an offset better than PCell" and the measurement event A5 is that "PCell becomes worse than threshold1 and neighbor becomes better than threshold2".

When the communications apparatus 100 operates in a connected mode, such as the Radio Resource Control (RRC) connected mode, the processor 222 may keep monitoring and measuring the cells configured by the network device and may transmit a corresponding measurement report when needed (that is, when one or more reporting criteria configured by the network device are met). As well-known in the art, when the communications apparatus 100 operates in the connected mode, the measurement report is the way to achieve mobility for the communications apparatus 100.

Figure 3A:
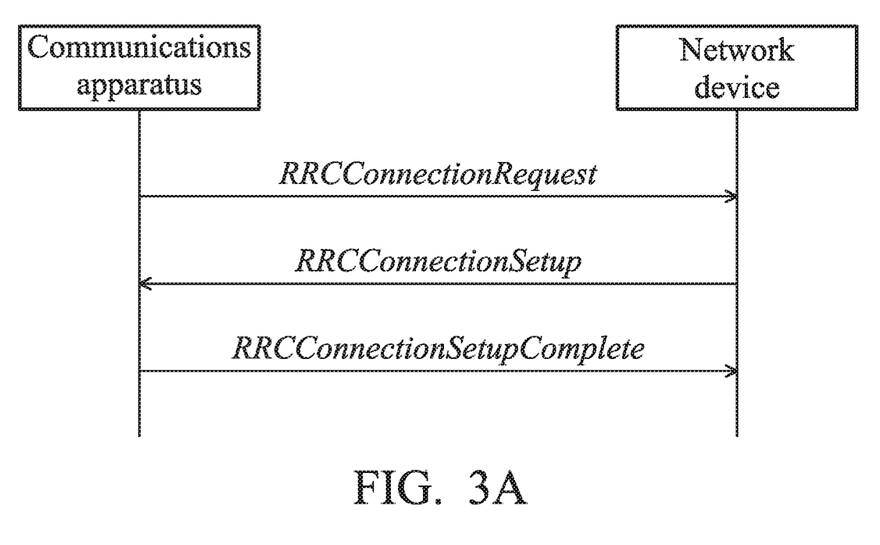
FIG. 3A shows an exemplary message flow of performing RRC connection establishment according to an embodiment of the invention.

FIG. 3A shows an exemplary message flow of performing RRC connection establishment according to an embodiment of the invention. The communications apparatus 100 (or, the processor 222) may transmit an RRCConnectionRequest message to the network device to request for establishing an RRC connection. In response to the RRCConnectionRequest message, the network device may set up the RRC connection and transmit an RRCConnectionSetup message to the communications apparatus 100. In response to the RRCConnectionSetup message, the communications apparatus 100 may set up the RRC connection and transmit an RRCConnectionSetupComplete message to complete the RRC connection establishment.

Figure 3B:
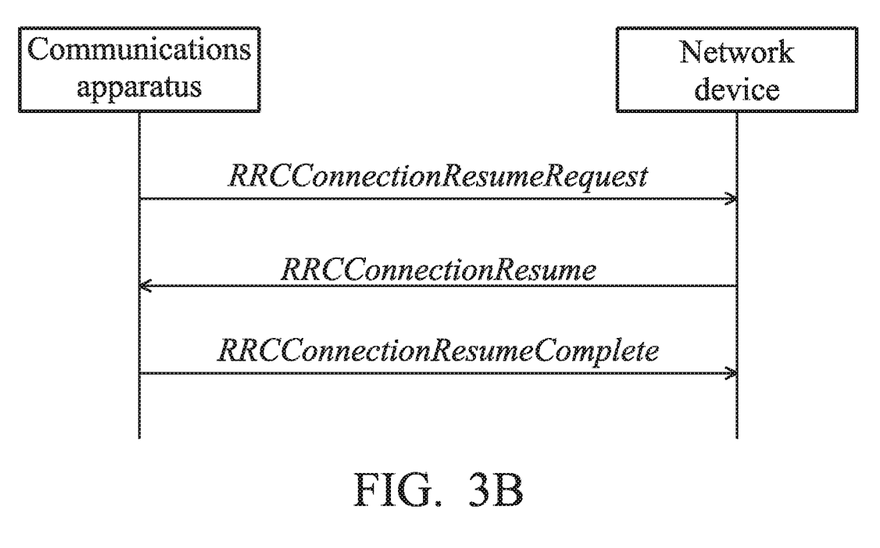
FIG. 3B shows another exemplary message flow of performing RRC connection establishment according to an embodiment of the invention.

FIG. 3B shows another exemplary message flow of performing RRC connection establishment according to an embodiment of the invention. The message flow shown in FIG. 3B is utilized for resuming an RRC connection. The communications apparatus 100 (or, the processor 222) may transmit an RRCConnectionResumeRequest message to the network device to request for resuming an RRC connection. In response to the RRCConnectionResumeRequest message, the network device may resume the RRC connection and transmit an RRCConnectionResume message to the communications apparatus 100. In response to the RRCConnectionResume message, the communications apparatus 100 may resume the RRC connection and transmit an RRCConnectionResumeComplete message to complete the RRC connection resume procedure.

For more details regarding the RRC connection setup and RRC connection resume, reference may be made to 3GPP TS36.331(LTE)/TS38.331(NR), Chapter 5.3.3—RRC Connection Establishment.

Generally, the RRC connected mode is entered when the communications apparatus 100 has received the RRCConnectionSetupComplete message or the RRCConnectionResumeComplete message. When the communications apparatus 100 operates in the RRC connected mode and reports a cell to the network device via a measurement report, the network device may give mobility command (e.g. a handover command or a redirection command) to communications apparatus 100 to remove connection with the cell and configure the communications apparatus 100 to go to other cell or other RAT when required. For example, when the communications apparatus 100 reports the measurement event A2, A3 or A5 to the network device via the corresponding measurement report, the network device may give a handover command or a redirection command, in which a target cell (and/or a target RAT) is specified by the network device, so as to hand over or redirect the communications services corresponding to the communications apparatus 100 to the target cell (and/or a target RAT).

However, the network device may sometimes ignore the measurement report for some unknown reasons and does not give any mobility command to the communications apparatus 100. If the signal quality of the serving cell is getting worse and the network device does not give any mobility command to the communications apparatus 100, there may be a risk of losing connection with the serving cell. Even if the connection is not lost, the poor signal quality may still cause high latency, and this will seriously exacerbate problems with the user experience. To solve this problem, methods for enhancing mobility of the communications apparatus 100 are provided.

Note that in the embodiments of the invention, regarding the aforementioned term 'serving cell', there may be only one serving cell comprising the primary cell for the communications apparatus 100 in the RRC connected mode (RRC_CONNECTED) and not configured with carrier aggregation (CA)/Dual Connectivity (DC). For the communications apparatus 100 in the RRC connected mode (RRC_CONNECTED) and configured with CA/DC, the term 'serving cells' is used to denote the set of one or more cells comprising the primary cell and all secondary cells.

Figure 4:
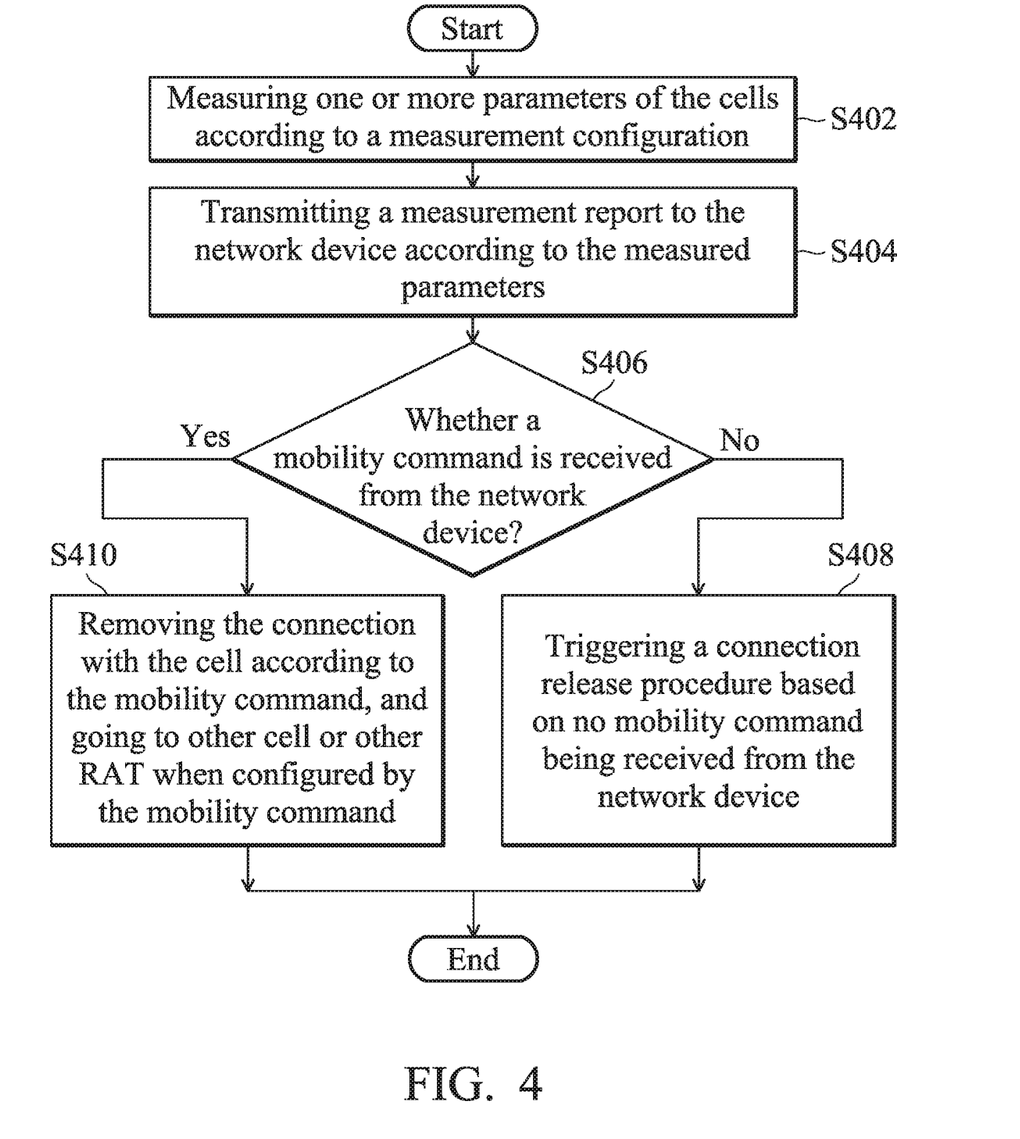
FIG. 4 is an exemplary flow chart of a method for enhancing mobility of a communications apparatus according to an embodiment of the invention.

FIG. 4 is an exemplary flow chart of a method for enhancing mobility of a communications apparatus in a connected mode according to an embodiment of the invention. According to an embodiment of the invention, the communications apparatus 100 (or, the processor 222) is in the connected mode and communicate with a plurality of cells in the cellular network. The communications apparatus 100 may keep monitoring the cells configured by the network device and measuring one or more parameters of the cells according to a measurement configuration configured by the network device (Step S402). Next, the communications apparatus 100 may transmit a measurement report according to the measured parameters of the one or more cells (Step S404). For example, the communications apparatus 100 may determine whether signal quality of a monitored cell has become poor. Here, the monitored cell may be the serving cell for the communications apparatus 100 in the RRC connected mode not configured with CA/DC or one of the serving cells for communications apparatus 100 in the RRC connected mode configured with CA/DC. The determination of whether signal quality of a monitored cell has become poor may be made based on the criteria configured by the network device. For example, whether the signal quality of a serving cell becomes worse than a first predefined threshold, whether the signal quality of a neighbor cell becomes better than a second predefined threshold, whether the signal quality of a neighbor cell becomes an offset better than the signal quality of a serving cell, or others.

After the measurement report has been transmitted to the network device, the communications apparatus 100 may further determine whether a mobility command is received from the network device (Step S406). Then, the communications apparatus 100 may trigger a connection release procedure based on no mobility command being received from the network device (Step S408), so as to enhance mobility of the communications apparatus in the connected mode. Otherwise, if a mobility command is received from the network device, the communications apparatus 100 may remove the connection with the cell according to the mobility command, and go to other cell or other RAT when configured by the mobility command (step S410).

According to an embodiment of the invention, when the monitored cell is the serving cell of the communications apparatus 100 in the RRC connected mode (that is, there is an RRC connection established between the serving cell and the communications apparatus 100) and the communications apparatus 100 is not configured with DC, the connection release procedure in step S408 is a RRC re-establishment procedure to re-establish the RRC connection with a cell. Unlike a handover or redirection procedure with a target cell which specified by a handover command or a redirection command, there is no target cell indicated by the network device in the RRC re-establishment procedure. Therefore, the communications apparatus 100 has to search for a suitable cell as the target cell and try to establish/reestablish the RRC connection with the target cell. Note that the target cell obtained by the communications apparatus 100 may be the original serving cell or another cell that is different from the original serving cell.

Figure 5:
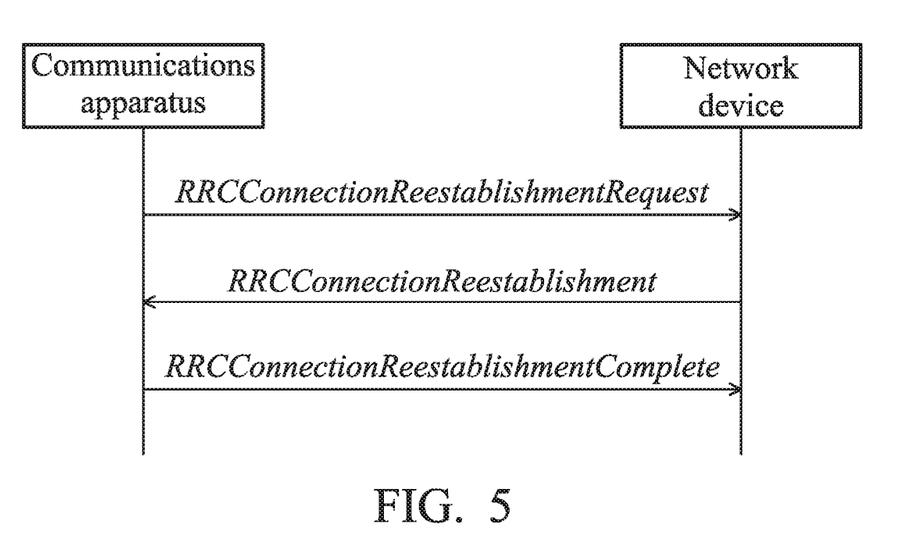
FIG. 5 shows an exemplary message flow of performing an RRC connection reestablishment procedure according to an embodiment of the invention.

FIG. 5 shows an exemplary message flow of performing an RRC connection re-establishment procedure according to an embodiment of the invention. The communications apparatus 100 (or, the processor 222) may transmit an RRCConnectionReestablishmentRequest message to the network device (for example, the suitable cell that the communications apparatus 100 found as discussed above) to request for re-establishing the RRC connection. In response to the RRCConnectionReestablishmentRequest message, the network device may re-establish the RRC connection and transmit an RRCConnectionReestablishment message to the communications apparatus 100. In response to the RRCConnectionReestablishment message, the communications apparatus 100 may re-establish the RRC connection and transmit an RRCConnectionReestablishmentComplete message to complete the RRC connection re-establishment procedure.

For more details regarding the RRC connection re-establishment, reference may be made to 3GPP TS36.331(LTE)/TS38.331(NR), Chapter 5.3.7—RRC Connection Re-establishment.

According to another embodiment of the invention, when the monitored cell is the primary cell of the SCG associated with the communications apparatus 100 in the RRC connected mode configured with DC, the connection release procedure in step S408 is a SCG failure information procedure to notify another monitored cell that an SCG failure has occurred, wherein the other monitored cell is the primary cell of the MCG associated with the communications apparatus 100.

Figure 6:
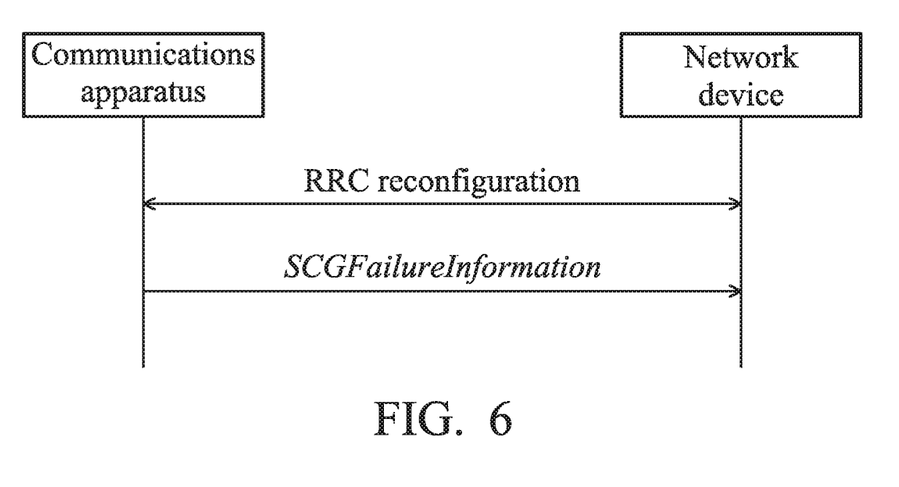
FIG. 6 shows an exemplary message flow of performing an SCG failure information procedure according to an embodiment of the invention.

FIG. 6 shows an exemplary message flow of performing an SCG failure information procedure according to an embodiment of the invention. After the RRC reconfiguration procedure, the communications apparatus 100 (or, the processor 222) may transmit an SCGFailureInformation message to the network device to inform the network device in the E-UTRAN (Evolved Universal Terrestrial Radio Access Network) or NR about an SCG failure the communications apparatus 100 has experienced. For example, an SCG radio link failure, a failure of SCG reconfiguration with sync, an SCG configuration failure, etc. . . .

When the primary cell of the MCG is notified that the communications apparatus 100 has experienced an SCG failure, the primary cell of the MCG may determine whether to disconnect the connection between the communications apparatus 100 and the primary cell of the SCG and instruct the communications apparatus 100 to establish another connection with another cell.

For more details regarding the RRC connection re-establishment, reference may be made to 3GPP TS38.331 Ch 5.7.3—SCG failure information.

In an embodiment of the invention, the connection release procedure in step S408 is triggered in response to no mobility command being received from the network device after transmitting the measurement report for a predetermined period of time. To be more specific, the communications apparatus 100 (or, the processor 222) may start a timer (or, a counter) to count for the predetermined period of time in response to transmitting the measurement report. When the predetermined timer expires and no mobility command is received from the network device, the connection release procedure is triggered. Note that the length of the predetermined period of time may be configured by the network device.

According to another embodiment of the invention, the connection release procedure in step S408 is triggered in response to no mobility command being received from the network device after transmitting the measurement report a predetermined times. To be more specific, when the times the communications apparatus 100 (or, the processor 222) has transmitted the measurement report to the network device has reached the predetermined times, such as five times, and no mobility command is received from the network device, the connection release procedure is triggered. Note that the value of the predetermined number of times may be configured by the network device.

Figure 7:
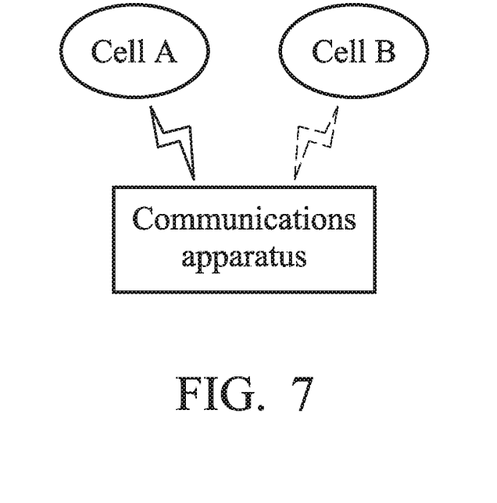
FIG. 7 is an exemplary diagram showing the scenario when the communications apparatus is not configured with DC according to an embodiment of the invention.

FIG. 7 is an exemplary diagram showing the scenario when the communications apparatus 100 is not configured with DC according to an embodiment of the invention. In this exemplary scenario, the communications apparatus 100 may operate in the RRC connected mode and establish an RRC connection with cell A. Therefore, in this embodiment, the cell A is the current serving cell of the communications apparatus 100.

The communications apparatus 100 (or, the processor 222) may measure parameters of the one or more cells, including the serving cell A, according to a measurement configuration configured by the network device, and transmit a measurement report to the network device, such as an A2, A3 or A5 measurement report. Upon detecting no mobility command, such as a handover command and a redirection command, being received from the network device after transmitting the measurement report, the communications apparatus 100 self-release the connection with the serving cell A and trigger the aforementioned re-establishment procedure to search for a suitable cell, such as the neighbor cell B shown in FIG. 7, and try to re-establish the RRC connection with the cell B.

Unlike the conventional design, by triggering a connection release procedure upon detecting no mobility command being received from the network device after transmitting the measurement report, the communications apparatus 100 can quickly go to another cell to re-establish a connection for getting better service quality and improving the user experience.

Note that the scenario shown in FIG. 7 may also be applied when the communications apparatus 100 is configured with carrier aggregation (CA). That is, the proposed method for enhancing mobility of the communications apparatus can also be applied when the communications apparatus 100 is configured with CA. In the CA case, the cell A may be the primary cell (Pcell) of the CA (note that the secondary cell configured for the CA is not shown in FIG. 7).

Figure 8:
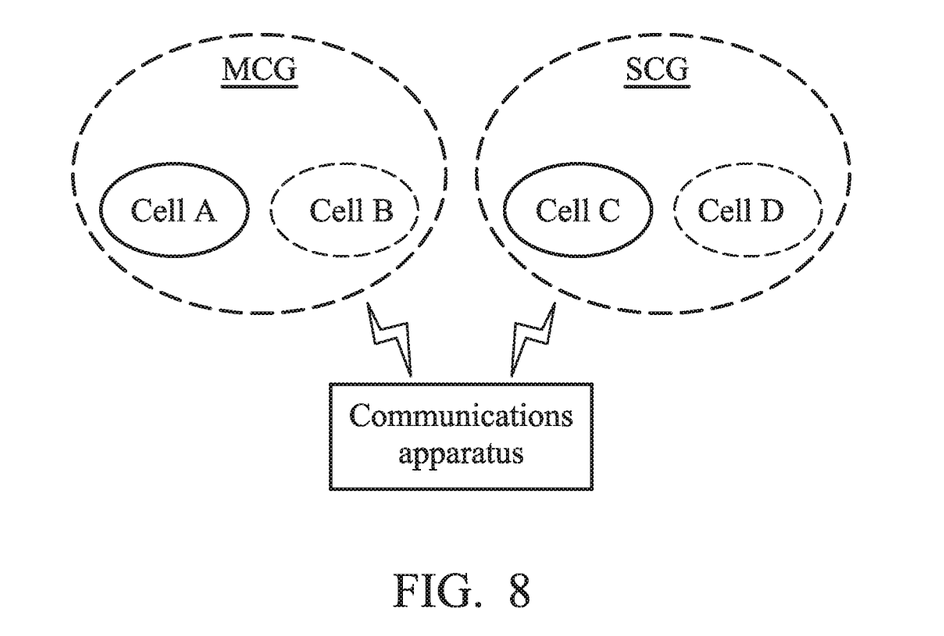
FIG. 8 is another exemplary diagram showing the scenario when the communications apparatus 100 is configured with DC according to an embodiment of the invention.

FIG. 8 is another exemplary diagram showing the scenario when the communications apparatus 100 is configured with DC according to an embodiment of the invention. In this exemplary scenario, the communications apparatus 100 may operate in the RRC connected mode and configured with DC. The communications apparatus 100 may establish an RRC connection with cell A, which is the primary cell of the MCG. The communications apparatus 100 may establish another connection, such as a data connection, with cell C, which is the primary cell of the SCG. Note that the RRC connection with cell A may also be a data connection.

In this embodiment, the communications apparatus 100 may be selectively configured with CA. That is, the proposed method for enhancing mobility of the communications apparatus can be applied to the communications apparatus 100 regardless of whether the communications apparatus 100 is configured with CA or not. When the communications apparatus 100 is configured with CA, the communications apparatus 100 may also establish another connection with a cell B, which is the secondary cell of the MCG and/or establish another connection with a cell D, which is the secondary cell of the SCG.

According to an embodiment of the invention, the communications apparatus 100 (or, the processor 222) may measure one or more parameters of the cells, at least including the cell A and the cell C, according to a measurement configuration configured by the network device, and transmit a measurement report to the network device when the processor 222.

Upon detecting no mobility command, such as disconnecting cell A and establishing connection with another cell, being received from the network device after transmitting the measurement report, the communications apparatus 100 triggers the aforementioned SCG failure information procedure to notify the cell A that an SCG failure has occurred. When the SCG failure information procedure is triggered, it's expected that network would configure another better SCG to the communications apparatus 100. Note that in the embodiments of the invention, the communications apparatus 100 may selectively release the data connection with the primary cell C of the SCG when triggering the aforementioned SCG failure information procedure.

Similarly, unlike the conventional design, by triggering a connection release procedure upon detecting no mobility command being received from the network device after transmitting the measurement report, the communications apparatus 100 can directly trigger the SCG failure information procedure to notify the Pcell of the MCG that an SCG failure has occurred earlier. In this manner, the Pcell of the MCG can determine whether to disconnect the connection between the communications apparatus 100 and the Pcell of the SCG and instruct the communications apparatus 100 to establish another connection with another SCG cell earlier, and the user experience can be greatly improved.

Note that the aforementioned situation is described for cases where the SCG signal quality becomes worse and MCG signal quality is still good. For cases where the MCG signal quality becomes worse and SCG signal quality is still good, according to another embodiment of the invention, upon detecting no mobility command being received from the network device after transmitting the measurement report, the communications apparatus 100 may choose to self-release the connection with the MCG, for example, the connection with the cell A, and trigger the aforementioned re-establishment procedure to search for another suitable cell, and try to re-establish the connection with the suitable cell. In other embodiment, the communications apparatus 100 may keep the connection with the MCG.

For cases where both the MCG signal quality and SCG signal quality become worse, upon detecting no mobility command being received from the network device after transmitting the measurement report, the communications apparatus 100 may choose to self-release the connection with the cell A and trigger the aforementioned re-establishment procedure to search for another suitable cell, and try to re-establish the connection with the suitable cell.

Via the embodiments discussed above, by applying the proposed method for enhancing the mobility of the communications apparatus, the communications apparatus 100 may directly trigger the aforementioned procedure without going through the whole procedure of determining that a Radio link failure (RLF) has occurred. (For more details regarding the Radio link failure related actions, reference may be made to 3GPP TS36.331(LTE) Chapter 5.3.11 Radio link failure related actions or TS38.331(NR) Chapter 5.3.10 Radio link failure related actions.)

That is, the invention allows the communications apparatus 100 to triggering a connection release procedure before RLF occurs. In this manner, the communications apparatus 100 does not have to wait for the expiration of some timer related to the RLF determination or does not have to wait for some condition to determine that the RLF has occurred is met, which greatly shorten the time required for the communications apparatus 100 leave a poor cell and go to another cell. In other words, based on the proposed method, the communications apparatus 100 can leave a poor cell and go to another cell to get better service quality much earlier than the conventional design. In this manner, the user experience can be greatly improved.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A user equipment (UE), comprising:
   a transceiver, transmitting or receiving wireless signals to communicate with a network device; and
   a processor coupled to the transceiver such that the processor performs operations comprising:
   establishing a connection with a cell;
   measuring one or more parameters of one or more cells;
   transmitting a measurement report to the network device according to the measured parameters of the one or more cells;
   determining whether a mobility command is received from the network device after transmitting the measurement report; and
   triggering a connection release procedure by the UE based on no mobility command being received from the network device after transmitting the measurement report.

2. The UE as claimed in claim 1, wherein the measurement report is associated with whether signal quality of the cell in connection is worse than a first threshold.

3. The UE as claimed in claim 2, wherein the measurement report is associated with whether signal quality of another cell not in connection is better than a second threshold.

4. The UE as claimed in claim 1, wherein the measurement report is associated with whether signal quality of another cell not in connection is an offset better than signal quality of the cell in connection.

5. The UE as claimed in claim 1, wherein the mobility command includes at least one of a handover command and a redirection command.

6. The UE as claimed in claim 1, wherein the mobility command is associated with disconnecting the cell.

7. The UE as claimed in claim 6, wherein the mobility command is associated with establishing connection with another cell.

8. The UE as claimed in claim 1, wherein the connection release procedure includes at least one of a re-establishment procedure and an secondary cell group (SCG) failure information procedure.

9. The UE as claimed in claim 1, wherein the triggering the connection release procedure based on no mobility command being received from the network device after transmitting the measurement report includes:
   triggering the connection release procedure in response to no mobility command being received from the network device after transmitting the measurement report for a predetermined period of time.

10. The UE as claimed in claim 1, wherein the triggering the connection release procedure based on no mobility command being received from the network device after transmitting the measurement report includes:

triggering the connection release procedure in response to no mobility command being received from the network device after transmitting the measurement report a predetermined times.

11. A method applied to a user equipment (UE), comprising:
   establishing a connection with a cell;
   measuring one or more parameters of one or more cells;
   transmitting a measurement report to a network device according to the measured parameters of the one or more cells;
   determining whether a mobility command is received from the network device after transmitting the measurement report; and
   triggering a connection release procedure by the UE based on no mobility command being received from the network device after transmitting the measurement report.

12. The method as claimed in claim 11, wherein the measurement report is associated with whether signal quality of the cell in connection is worse than a first threshold.

13. The method as claimed in claim 12, wherein the measurement report is associated with whether signal quality of another cell not in connection is better than a second threshold.

14. The method as claimed in claim 11, wherein the measurement report is associated with whether signal quality of another cell not in connection is an offset better than signal quality of the cell in connection.

15. The method as claimed in claim 11, wherein the mobility command includes at least one of a handover command and a redirection command.

16. The method as claimed in claim 11, wherein the mobility command is associated with disconnecting the cell.

17. The method as claimed in claim 16, wherein the mobility command is associated with establishing connection with another cell.

18. The method as claimed in claim 11, wherein the connection release procedure includes at least one of a re-establishment procedure and an secondary cell group (SCG) failure information procedure.

19. The method as claimed in claim 11, wherein the triggering the connection release procedure based on no mobility command being received from the network device after transmitting the measurement report includes:
   triggering the connection release procedure in response to no mobility command being received from the network device after transmitting the measurement report for a predetermined period of time.

20. The method as claimed in claim 11, wherein the triggering the connection release procedure based on no mobility command being received from the network device after transmitting the measurement report includes:
   triggering the connection release procedure in response to no mobility command being received from the network device after transmitting the measurement report a predetermined times.

* * * * *